INVENTORS
HAROLD F. LEWIS
MONSON H. HAYES, JR.
BY Robert G Rogers
ATTORNEY

INVENTORS
HAROLD F. LEWIS
MONSON H. HAYES, JR.
BY Robert G Rogers
ATTORNEY

INVENTORS
HAROLD F. LEWIS
MONSON H. HAYES, JR.
BY Robert G. Rogers
ATTORNEY

APPROXIMATE GENERATION OF THE ENVELOPE OF Sθ OR Cθ

INVENTORS
HAROLD F. LEWIS
MONSON H. HAYES, JR.
BY Robert G Rogers
ATTORNEY

INVENTORS
HAROLD F. LEWIS
MONSON H. HAYES, JR.
BY Robert G Byer
ATTORNEY

INVENTORS
HAROLD F. LEWIS
MONSON H. HAYES, JR.
BY Robert G Rogers
ATTORNEY

INVENTORS
HAROLD F. LEWIS
MONSON H. HAYES
BY
ATTORNEY

INVENTORS
HAROLD F. LEWIS
MONSON H. HAYES
BY Robert G Rogers
ATTORNEY

OCTANT LOGIC

INVENTORS
HAROLD F. LEWIS
MONSON H. HAYES, JR.
BY
Robert G Rogers
ATTORNEY

United States Patent Office 3,478,198
Patented Nov. 11, 1969

3,478,198

SYSTEM FOR MODULATING INPUT SIGNALS WITH DIGITAL REFERENCE SIGNALS FOR GENERATING RESOLVER DRIVE SIGNALS

Harold F. Lewis, Villa Park, and Monson H. Hayes, Jr., Pacific Palisades, Calif., assignors to North American Rockwell Corporation, a corporation of Delaware Filed June 6, 1967, Ser. No. 643,959
Int. Cl. G06g *7/22, 7/26*
U.S. Cl. 235—186 7 Claims

ABSTRACT OF THE DISCLOSURE

A binary digital storage register having tangent $\theta$ and cotangent $\theta$ inputs (depending on the quadrant of an input signal) for modulating an input signal varying according to sine *wt* and cosine *wt*. The modulated signals provide signals varying according to the sine and cosine of angle $\theta$ as inputs to a Scott T transformer network for driving the stator windings of a synchro. The position of the rotor is equivalent to the input angle $\theta$.

BACKGROUND OF THE INVENTION

Field of the invention

This invention relates to a system for modulating an input signal with a digital input signal for driving a synchro and, more specifically, to such a system using tangent $\theta$ and cotangent $\theta$ digital input signals for generating drive signals to a synchro receiver.

Description of prior art

Synchros must be driven by sine/cosine varying signals. As a result, an input reference signal must be modulated with a sine and cosine varying signal for driving the synchro.

Prior art digital to synchro converter systems developed by applicant have required the use of at least two input registers for storing digital modulation signals (representing cosine $\theta$ and sine $\theta$) and at least two digital to analog converter networks providing means for modulating an analog input signal with the digital signals stored in the registers.

In the present invention, by using properly referenced tangent $\theta$ and/or cotangent $\theta$ signals in lieu of the sine $\theta$/cosine $\theta$ inputs, and by recognizing the interval when the tangent $\theta$ and cotangent $\theta$ signals approximate sine and cosine $\theta$ signals, it is possible to approximate the sine-cosine signal generation. If it is not necessary to generate sine $\theta$ and cosine $\theta$ modulation signals, added storage registers and digital to analog converters may be eliminated.

In some cases, if the approximate generation of sine $\theta$ and cosine $\theta$ signals is in excess of the deviation permitted by certain receiving synchro systems, it may be necessary to interpose correction circuitry between the input signal and the synchro for reducing the error.

Except for the description above, applicant is unaware of any art which anticipates the invention described herein.

SUMMARY OF THE INVENTION

Briefly, the invention comprises a system for generating a plurality of signals having a sine and cosine relationship for energizing the stator windings of a synchro resolver. The rotor rotates by an amount equivalent to the phase angle $\theta$ of the generated signals.

The system includes register means for storing digital numbers in binary form representing tangent and cotangent values of an angle $\theta$ from, for example, a signal picked off from an inertial instrument. The register means provides output signals to an alternating current digital to analog converter (AC–DAC), for modulating reference signals to the system by the tangent or cotangent values, depending on the quadrant of the input signal. In other words, since tangent $\theta$ approximates sine $\theta$ during the first, fourth, fifth and eighth quadrants (45°, 180°, 225° and 360°), it can be used to modulate the reference signal during the quadrants indicated. During the second, third, sixth and seventh quadrants (90°, 135°, 270° and 315°), the cotangent signal approximates a cosine $\theta$ signal and can be used to modulate the input signal during the quadrants indicated. The approximation of these two signals, however, does not effect the accuracy of the angle $\theta$ being generated by this device.

Inasmuch as with other quadrants, the tangent and cotangent signals approach infinity, means are included for switching between tangent $\theta$ and cotangent $\theta$ signals at the proper intervals so that properly correlated signals are provided to the inputs of a Scott T transformer. The Scott T transformer provides output signals on three lines varying in amplitude in accordance with cosine ($\theta$), cosine ($\theta+120°$), and cosine ($\theta-120°$) for energizing the stator windings of a synchro.

In one embodiment, correction circuitry may be added to the system. The correction circuit provides means which compensate for the common carrier signal amplitude approximations resulting from use of the tangent and cotangent signals.

Therefore, it is an object of this invention to provide an improved system for converting digital values into signals for driving a synchro device using an approximation scheme.

Still a further object of this invention is to provide a system for driving a synchro resolver by modulating a reference signal with digital values representing trigonometric functions.

Another object of this invention is to provide a system using a single digital register means and a single alternating current digital analog converter means for modulating input signals with the values stored in the register means for producing signals for driving a synchro resolver.

These and other objects of this invention will become more apparent in connection with the following drawings.

Figure 1:
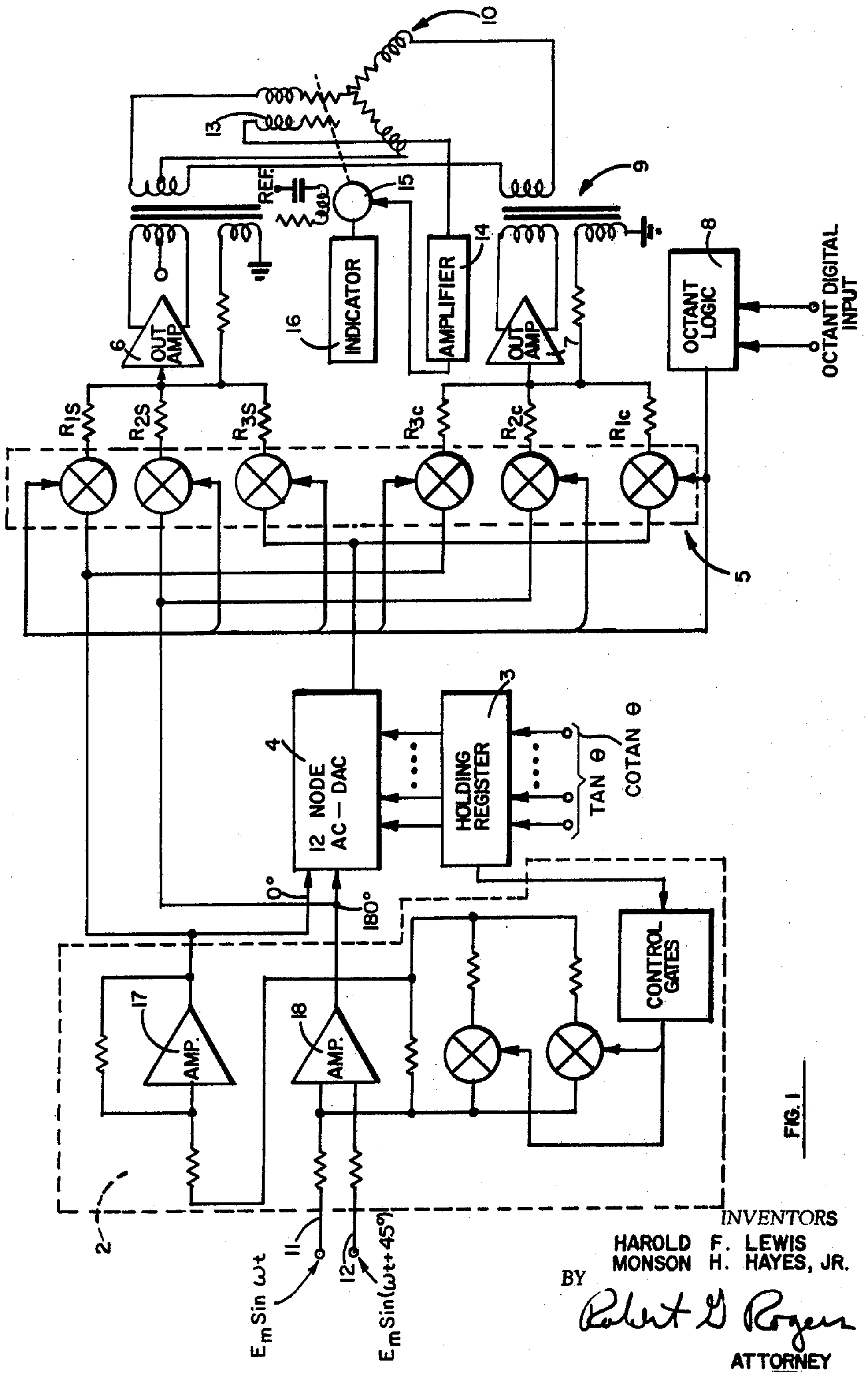
FIGURE 1 illustrates a functional block diagram of a system for modulating reference signals with digital signals representing trigonometric functions for driving a synchro resolver.

FIGURES *5a* and *5b* illustrate one embodiment of digital to analog converter means usable in the FIGURE 1 embodiment.

Figure 6:
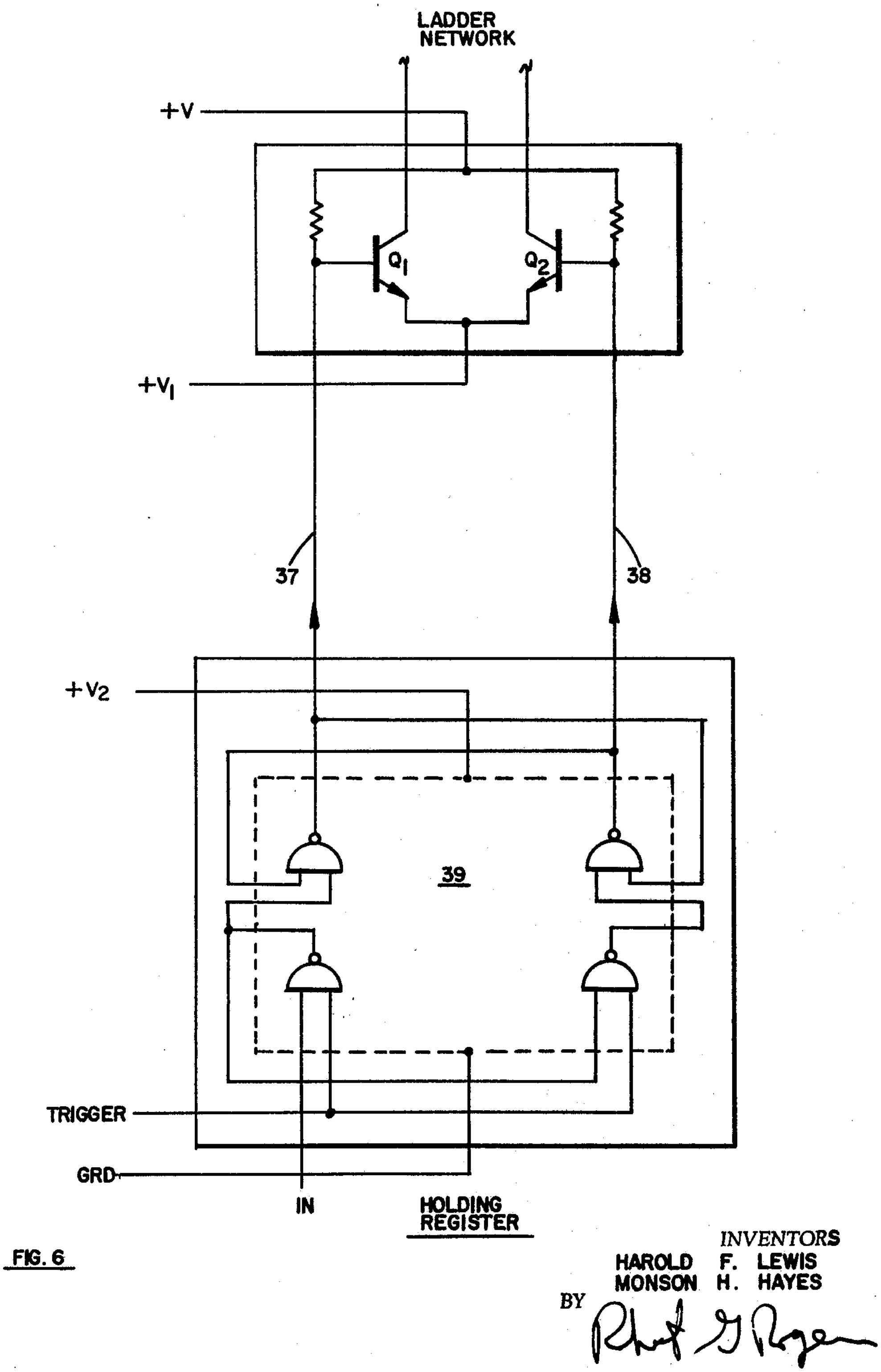

FIGURE 6 is an illustration of a portion of a storage register and converter switching circuit usable in the FIGURE 1 embodiment.

Figure 7:
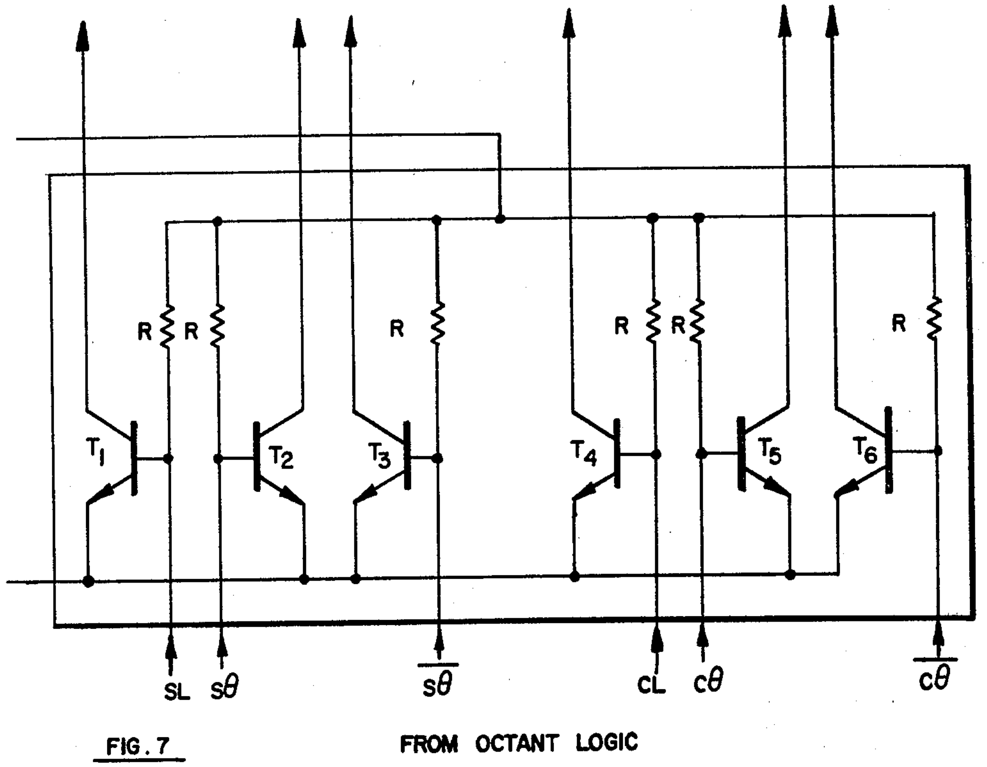

FIGURE 7 is an illustration of multiplexer switches usable in the FIGURE 1 embodiment for controlling switching of signals into the output amplifiers.

Figure 8:
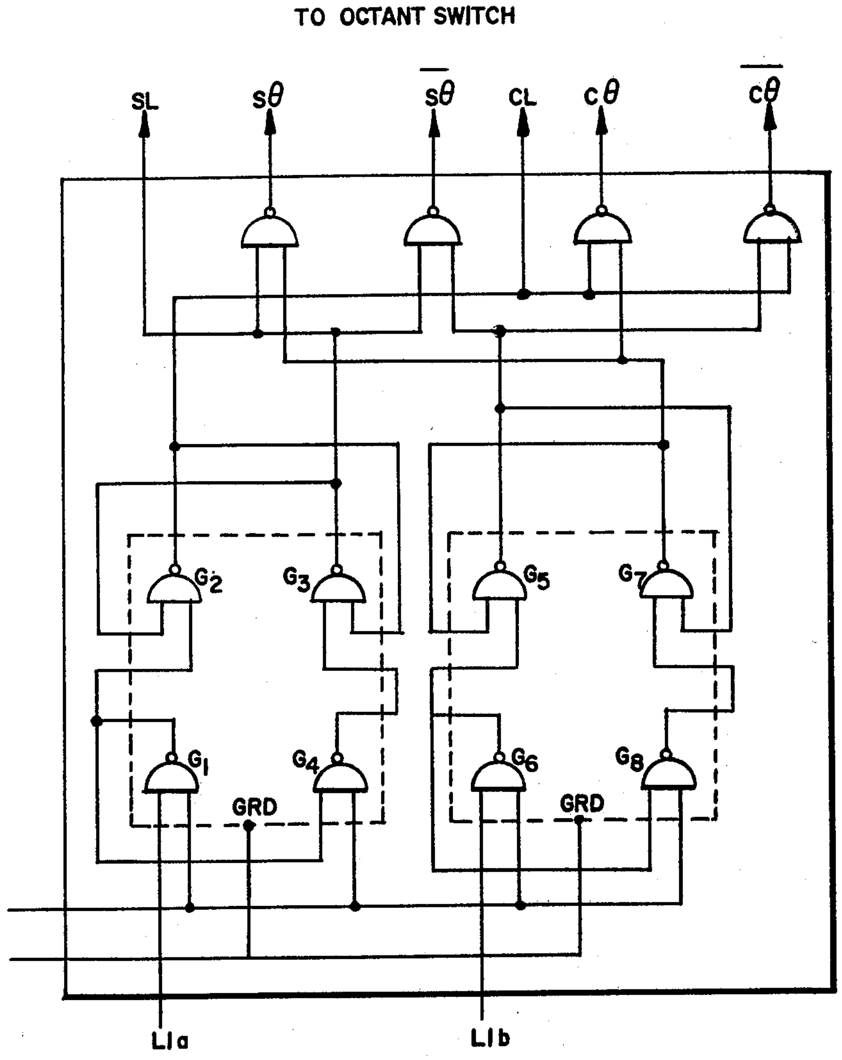

FIGURE 8 is an illustration of a logic network used in driving the multiplexer switches shown in FIGURE 7.

DESCRIPTION OF PREFERRED EMBODIMENTS

FIGURE 1 shows a preferred embodiment of system 1 for modulating reference signals appearing at input terminals 11 and 12 to the system with digital control signals for simulating sine and cosine varying signals. The signals are used in driving a synchro resolver whereby the angle $\theta$ associated with the digital signals may be accurately determined. The preferred embodiment includes correction circuit means 2, although in other embodiments, the correction circuit could be eliminated.

Figure 2:
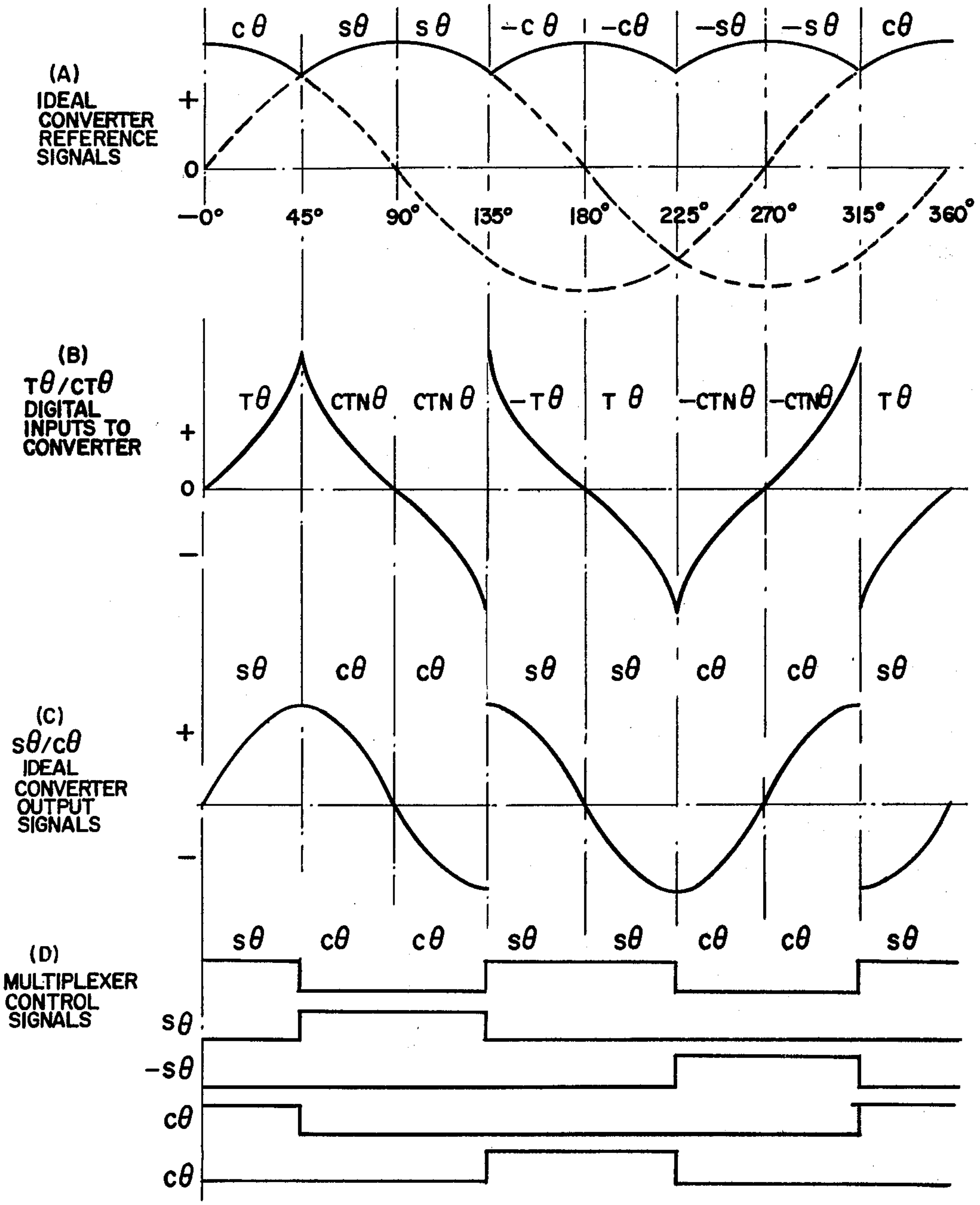
FIGURE 2 is an illustration of a plurality of signals used and/or generated by the FIGURE 1 system.

The system without the correction circuit includes register means 3 for alternately storing tangent $\theta$ and cotangent $\theta$ digital input signals. The input signals may be generated by a computer (not shown) which is connected for monitoring the signals being picked off, for example, from an inertial instrument such as a gyro. The tangent $\theta$/cotangent $\theta$ signals are in 2's complement digital form and are represented as shown in FIGURE 2*b*. Digital values for the signals are stored in the register.

The register means is connected to alternating current digital to analog converter means 4 which may be comprised of a 12 node phase sensitive network. The converter includes inputs from the correction circuit which are 180° out of phase. In other embodiments, the converter may receive inputs directly from input terminals 11 and 12. The signals at the input to converter network 4 vary in accordance with the following equation. The signals are illustrated in FIGURE 2*a*.

For octants 1, 4, 5 and 8 the signals are:

$$e=EM|\cos\theta|\sin(wt+\theta_1)$$
$$e-EM|\cos\theta|\sin(wt+\theta_1+180°)$$

where $\theta_1$=carrier phase shift angle between 0° and 45°.

For octants 2, 3, 6 and 7 the signals are:

$$e=Em|\sin\theta|\sin(wt+\theta_1)$$
$$e=Em|\sin\theta|\sin(wt+\theta_1+180°)$$

at any given angle $\theta$.

The signals at the input terminals 11 and 12 may be represented by the following equation:

$$e_{11}=Em\sin wt \text{ and } e_{12}=Em\sin(wt+45°)$$

where $w=2\pi f$ and F may be 400 cps.

In other embodiments, it may be possible to delete the input to terminal 12.

The converter is connected to multiplex switching means 5 comprising six switches connected to receive signals from the converter and from the correction circuit. The output signals from the converter are shown in FIGURE 2*c*. If the correction circuit were not included, certain of the switching means would receive signals directly from the input terminals. The network is divided into an upper portion designating sine $\theta$ signals and a lower portion designating cosine $\theta$ signals. The upper portion of the multiplexer switching means is connected through resistor means labeled $R_{1s}$, $R_{2s}$, and $R_{3s}$ to amplifier means 6. The lower portion is connected through resistor means labeled $R_{3c}$, $R_{2c}$ and $R_{1c}$, to amplifier means 7. The resistors having the same designation have the same value for the embodiment shown.

The amplifier schematics are not described in detail here. It is believed that the mechanization of such amplifier is well known to those skilled in the art. The input signals may be represented by the following formula:

(1) Without correction circuitry: From converter 4 during cotangent inputs $e=E_r$ cotangent $\theta$ sin $\theta$ sin $wt$, where $E_r=K_1E_m$, and (2) With correction circuitry: From converter 4 during cotangent inputs $e=E_r$ cotangent $\theta$ sin $\theta$ sin $wt$, where $E_r=K_1E_m$, and during tangent inputs $e=E_r$ tangent $\theta$ cos $\theta$ sin $wt$.

The multiplexer switching network is controlled by digital output signals from octant logic control means 8 which receives digital input signals from the computer previously described. Depending on the setting of the logic means, one of the lower switches is turned on and one of the upper switches is turned on so that the proper signal from either the correction circuit or the converter is used as an input to the amplifiers. For a full 360° cycle, a sine $\theta$ varying signal is received by amplifier 6 and a cosine $\theta$ varying signal is received by amplifier 7. The control signals are shown in FIGURE 2*d*.

Scott T transformer means 9 is connected to receive the outputs from the amplifiers and to provide inputs to synchro resolver means 10. The Scott T provides three outputs which are connected to three stator windings of the synchro. The output signals may be represented by the following formula:

(1) Without correction circuitry:

| For octants **1**, **4**, **5**, **8** | For octants **2**, **3**, **6**, **7** |
|---|---|
| $e_1=E_r\left\|\frac{1}{\text{Cos }\theta}\right\|$ (Cos $\theta$) Sin $wt$ | $e_1=E_r\left\|\frac{1}{\text{Sin }\theta}\right\|$ Cos ($\theta$) Sin $wt$ |
| $e_2=E_r\left\|\frac{1}{\text{Cos }\theta}\right\|$ Cos ($\theta$+120°) Sin $wt$ | $e_2=E_r\left\|\frac{1}{\text{Sin }\theta}\right\|$ Cos ($\theta$+120°) Sin $wt$ |
| $e_3=E_r\left\|\frac{1}{\text{Cos }\theta}\right\|$ Cos ($\theta$−120°) Sin $wt$ | $e_3=E_r\left\|\frac{1}{\text{Sin }\theta}\right\|$ Cos ($\theta$−120°) Sin $wt$ |

(2) With ideal correction circuitry:

| | |
|---|---|
| $e_1=E_r$ Cos $\theta$ Sin $wt$ | $e_1=E_r$ Cos ($\theta$) Sin $wt$ |
| $e_2=E_r$ Cos ($\theta$+120°) Sin $wt$ | $e_2=E_r$ Cos ($\theta$+120°) Sin $wt$ |
| $e_3=E_r$ Cos ($\theta$−120°) Sin $wt$ | $e_3=E_r$ Cos ($\theta$−120°) Sin $wt$ |

As indicated by the formulas, a slight magnitude error occurs when the tangent $\theta$/cotangent $\theta$ values are used for modulation without the correction circuitry. However, the error is the same for all windings and as a result it has a negligible effect on the movement of the rotor. Rotor windings 13 of the synchro is connected to servo amplifier 14 and motor 15 for driving indicator means 16 until a null point is reached between the stator and rotor windings. Normally, the other reference signal indicated has phase coherence with the carrier sin $wt$ signal.

The indicator can be calibrated to show the correct value of the angle $\theta$ when the null has been achieved. If desired, the indicator may be provided with signal generator means for generating a signal to the computer so that the angle may be compared with a stored reference angle and an error signal generated if required.

Other resistors, capacitors, etc. shown as part of the correction circuit, are not described in detail, although their function should be obvious to persons skilled in the art.

Figure 3:
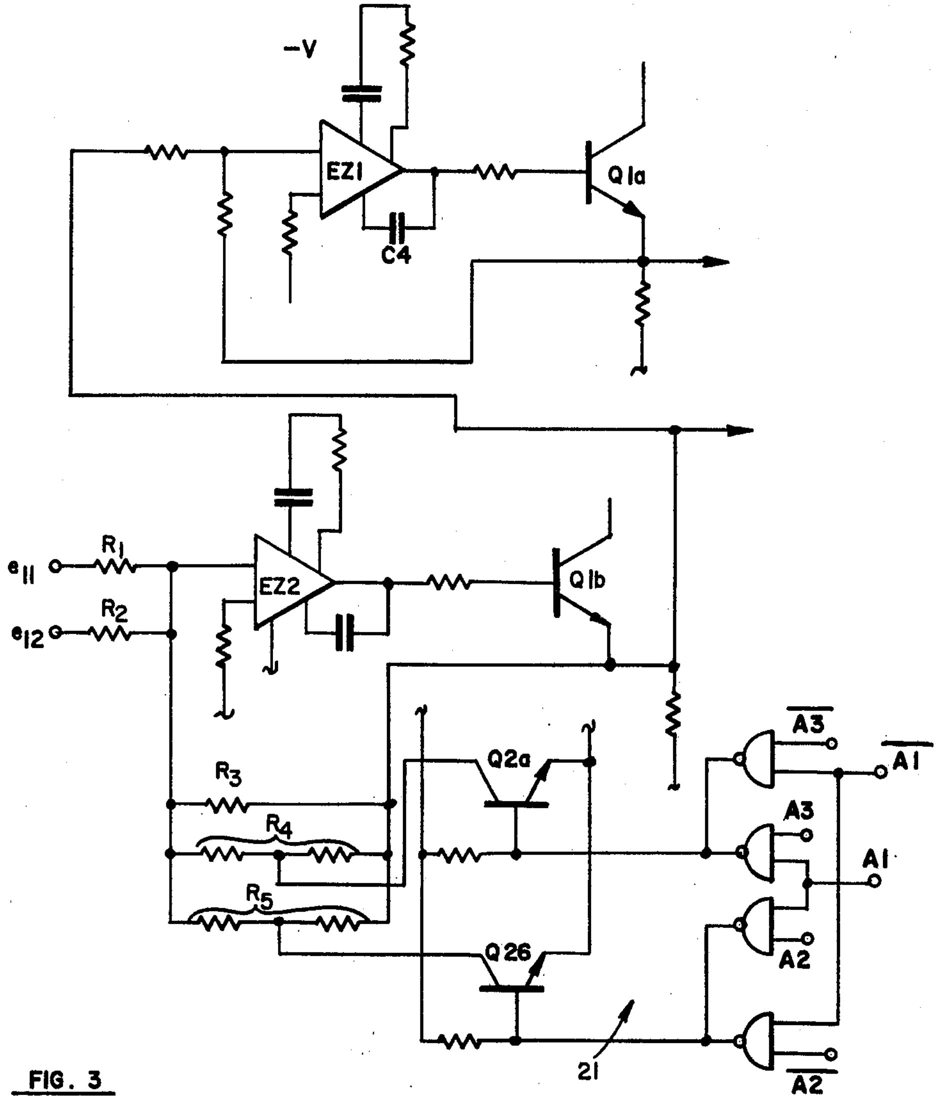
FIGURE 3 is an illustration of one embodiment of correction circuitry which may be used with the FIGURE 1 embodiment.

The correction circuit is shown in FIGURE 3. Resistors $R_1$ and $R_2$ are connected between the input to amplifier $EZ_2$ and input terminals 11 and 12. The resistors are selected relative to each other to yield a phase difference between the reference signals.

The amplitude correction is accomplished by changing the feedback resistance. The feedback may be proportional to that enabled by resistor $R_3$, or $R_4//R_3$, or $R_5//R_3$, or $R_5//R_4//R_3$, thus providing four (4) levels of amplitudes.

The output for amplifier $EZ_1$ through emitter follower $Q_{1b}$ comprises the input to amplifier $EZ_2$ through matched resistor pair $RN_1$. The matched resistors are selected for setting the closed loop gain of amplifier $EZ_2$. The amplifier phase splits (inverts) the signal from $EZ_1$ and generates an output signal through emitter follower $Q_{1b}$ which is 180° out of phase with the signal from $Q_{1a}$.

The emitter followers have a relatively low output impedance and the output impedance is further reduced by feedback, and as a result, the voltages are unaffected by the variable load of the converter.

Figure 4:
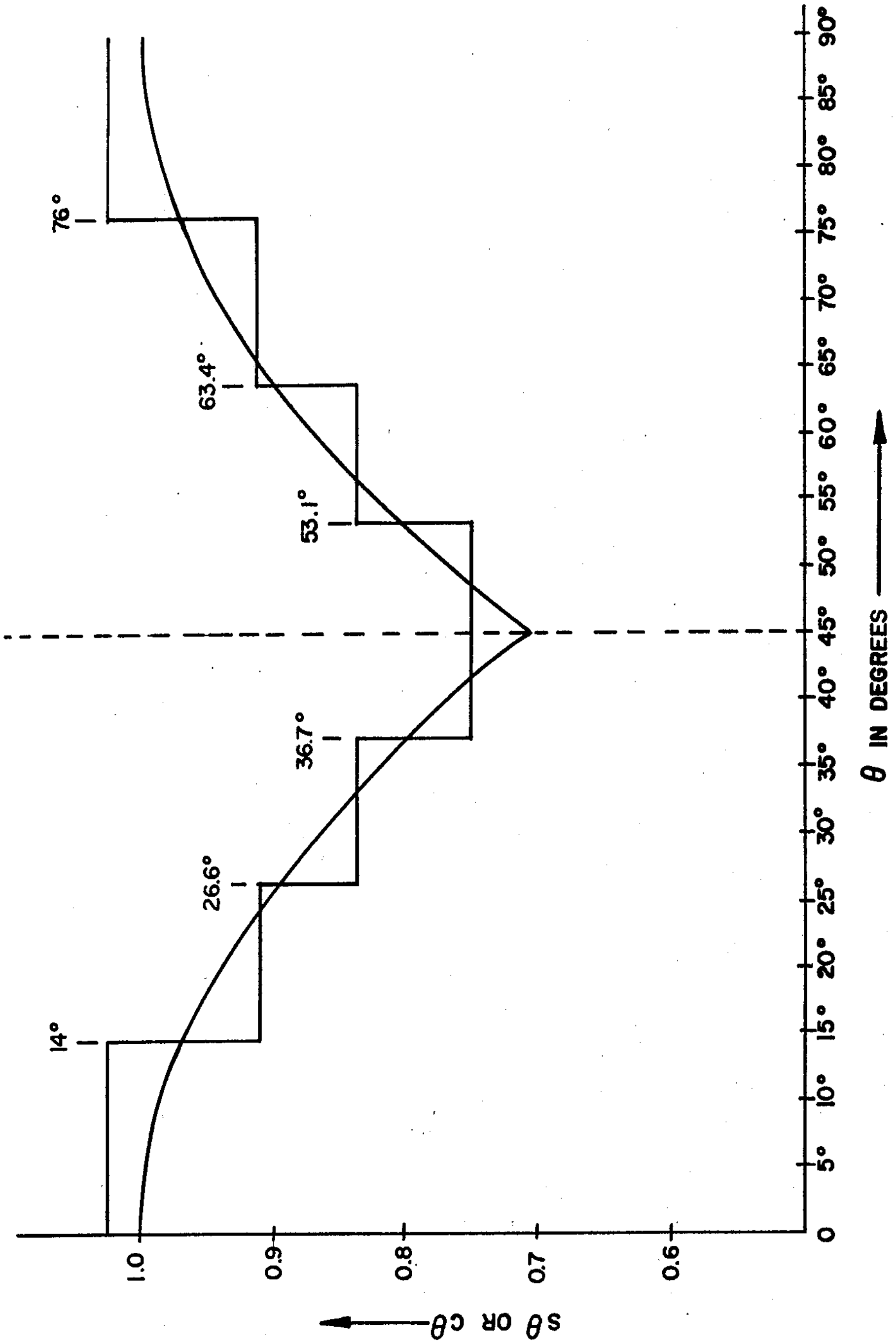
FIGURE 4 is an illustration of the correction signals produced by the FIGURE 3 circuitry.

As previously stated, the gain of amplifier $EZ_1$ is adjusted by switching feedback resistors. The resultant changes in output amplitudes are shown in FIGURE 4. The amplitude levels occur between 0° and 14° (76° and 90°), 14° and 26.6° (63.4° and 76°), 26.6° and 36.9° (53.1° and 63.4°), 36.9° and 45° (45° and 53.1°). An ideal waveform would appear as shown by the curve. However, due to the step change from one feedback value to another, the waveform comprises a plurality of changes. The cosine $\theta$ ($C\theta$) waveform is approximated between 0° and 45°. The sine $\theta$ ($S\theta$) waveform is approximated between 45° and 90°. The signal thus appearing at the output of $Q_{1a}$ departs from a perfect sin $\theta$/cosine $\theta$ envelope, as shown by the curve. It should be noted that the departure can be maintained to within ±6.5%. By adding additional resistor combinations and switches, the departure could be reduced further.

The feedback resistance is controlled by transistor switches $Q_{2a}$ and $Q_{2b}$ which have their control electrodes connected to control gating logic 21. When either one or both of the transistors are turned on, different resistor values are connected in the feedback loop. As the resistance is increased by steps, the signal is reduced in value.

Gating logic 21 is comprised of four NAND gates, $\overline{A}_3$, $A_3$, $A_2$, $\overline{A}_2$ having inputs $\overline{A}_3\overline{A}_1$, $A_3A_1$, $A_2A_1$, and $\overline{A}_2\overline{A}_1$ respectively.

The $A_2$, $A_3$ input values are derived from the most significant bit positions of the register means. The register accepts its digital inputs in 2's complement format.

Figure 5A:
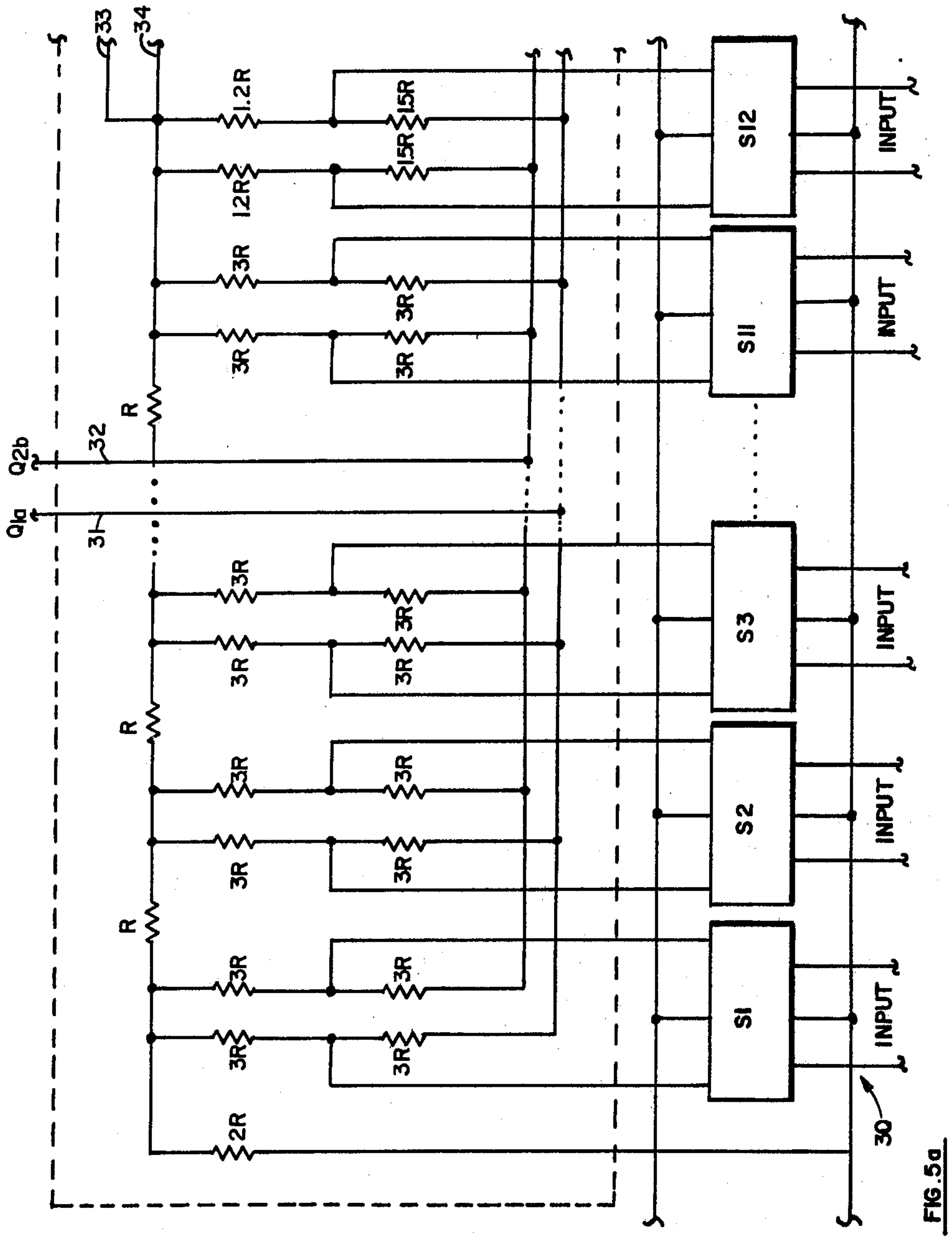
Figure 5B:
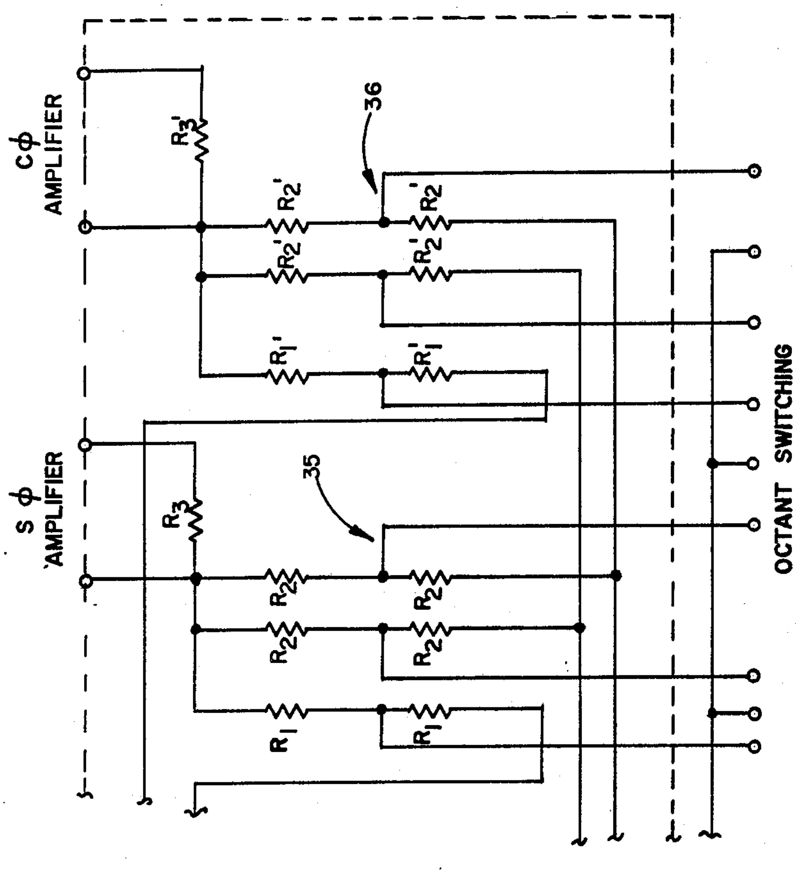

FIGURE 5*a* shows a resistor ladder network output comprising part of the digital to analog converter means described in FIGURE 1. FIGURE 5*b* shows a portion of the resistor networks for the multiplexer switch. The network includes inputs 30 from switches $S_1$ through $S_{12}$ comprising part of the converter (see FIGURE 6) and inputs 31 and 32 from emitter followers $Q_{1a}$ and $Q_{1b}$. Outputs 33 and 34 provide inputs to resistor networks 35 and 36 shown in FIGURE 1 as $R_{15}$ and $R_{16}$. The networks are connected to amplifiers 6 and 7. Only the resistor networks for multiplex switches 37 and 38 are illustrated. Other networks are similarly mechanized, although the signals for the other networks are received from other multiplex switches. Outputs from the resistor networks 35 and 36 are connected to $S\theta$ and $C\theta$ amplifiers.

The ladder network is comprised of resistors having related values. The lowest resistor has a value R and the highest resistor of the network has a value of 3R. The resistors are labeled accordingly. The network is modified from the usual networks in that the last node isolating resistor (R) has been deleted and the value of the sign bit summing resistors has been reduced to one-half the value of the rest of the bits (1.5R). These modifications reduce the equivalent output impedance of the ladder to $R/2$ and raise the equivalent full scale output voltage to one-third the reference voltage $ER/3$. These changes are beneficial since the output node is directly coupled to two sets of switched summing resistor networks through resistors $R_1$ and $R_{1'}$. The sine $\theta$ and cosine $\theta$ reference signals of both phases are switched into the resistor summing networks $R_c$ and $R_s$ through resistors $R_2$ and $R_{2'}$. $R_3$ and $R_{3'}$ are the feedback resistors for the sine $\theta$ and cosine $\theta$ output amplifiers.

The summing resistor networks are produced with the ladder resistor networks so that resistors yielding a very closely matched temperature coefficient may be selected by the manufacturer, thus assuring accuracy compatible without the necessity of using ladder output buffer.

FIGURE 6 shows a more detailed view of one of the switch means which controls the interconnection of the resistors of the ladder network. Each switch comprises transistors $Q_1$ and $Q_2$ having their base electrodes connected to a gating network associated with one bit position of the holding register.

NAND gating means 39 for one bit position of the holding register is shown with its outputs 37 and 38 connected to the base electrode of the transistors. The base electrodes of the transistor are connected to either ground or to a plus voltage (+V), sufficient to turn the transistor on. When the transistors are turned off, a voltage is developed across the resistors of the ladder network connected to the output of the switch.

The gating means is formed by connecting two gates back to back to form a positional binary and the other two gates to provide input enable or trigger inhibit. Each of the gating members may be strobed in parallel from a master register inside the computer (not shown).

Circuitry for the octant switches can be mechanized as shown in FIGURE 7. Input signals SL, $S\theta$, $\overline{S\theta}$, CL, $C\theta$, and $\overline{C\theta}$ (see FIGURE 2*d*) are generated by octant logic (not shown). The input signals control the switching sequence of transistors $T_1$ through $T_6$. Octant logic means 8 is shown in FIGURE 8. Eight gates ($G_1$ through $G_8$) perform holding cell functions (storage) and four gates ($G_9$ through $G_{12}$) decode the output for generating the signals as shown in FIGURE 2*d*. Inputs to the switching logic comprise inputs $LI_a$, $LI_b$ from the computers (not shown). Input line $LI_a$ is true during octants 1, 4, 5 and 8. Input line $LI_b$ is true during octants 4, 5, 6 and 7.

The multiplexer switches are actuated by the signals generated by logic means 8 so that during each of the octants from 1 to 8 amplifiers 6 and 7 receive the proper signals from either the converter or amplifiers $Q_{1a}$ and $Q_{1b}$ for developing signals having the proper relationship for driving the stator windings of the synchro. The following table shows the relationship and origin of the signals to the amplifiers during the quadrants listed. The signals identified as $S\theta$, $C\theta$, $-S\theta$, and $-C\theta$ are derived from emitter followers $Q_{1a}$ and $Q_{1b'}$.

| Octant | $S\theta$ output amplifier | $C\theta$ output amplifier |
|---|---|---|
| 1st | Converter | $C\theta$ |
| 2nd | $S\theta$ | Converter |
| 3rd | $S\theta$ | Do. |
| 4th | Converter | $-C\theta$ |
| 5th | do | $-C\theta$ |
| 6th | $-S\theta$ | Converter |
| 7th | $-S\theta$ | Do. |
| 8th | Converter | $C\theta$ |

Although the invention has been described and illustrated in detail, it is to be understood that the same is by way of illustration and example only, and is not to be taken by way of limitation.

We claim:

1. A system for generating synchro resolver drive signals by modulating a reference signal, said system comprising:

register means for storing digital values representing the tangent and cotangent trigonometric values of an input angle $\theta$ as a function of the angular octant of the reference signal, said register means having an output, first means responsive to the output from said register means and to said reference signal for modulating said reference signal with the trigonometric value stored in the register means, second means responsive to said modulated signal for generating one half of the drive signals to the stator windings of said synchro resolver, third means responsive to said reference signal for generating the other half of the drive signals to the stator windings of said synchro resolver.

2. The combination as recited in claim 1, including correction circuit means interposed between register means and said reference signal for modifying the reference signal to either one of a sine or cosine varying signal as a function of the trigonometric value stored in the register means.

3. A system for generating synchro resolver drive signals by modulating a reference signal, said system comprising:
- register means for storing digital values representing the tangent and cotangent trigonometric values of an input angle $\theta$ as a function of the angular octant of the reference signal, said register means having an output,
- first means responsive to the output from said register means and to said reference signal for modulating said reference signal with the trigonometric value stored in the register means for providing half the drive signals to the resolver stator windings,
- second means responsive to said reference signal for providing the other half of the drive signals to the resolver stator windings,
- correction circuit means being interposed between said first means responsive and the resolver for modifying said drive signals to either sine or cosine varying signals as a function of the trigonometric function stored in the register, said correction circuit modifying means including amplifier means and variable impedance means interposed between the input and output of said amplifier and means for varying the impedance means as a function of said value stored in the register means for generating said sine and cosine varying signals.

4. The combination as recited in claim 3, wherein said correction circuit means includes means for generating at least two signals 180° out of phase with each other.

5. The combination as recited in claim 4, wherein correction circuit means responsive to the values stored in said register means generate sinusoidally varying signals 180° out of phase with each other, and wherein one of said signals is used as a drive signal for said synchro resolver during certain octant angular intervals and wherein said first means responsive to said modulated signal is used as a drive signal for the synchro resolver during the other intervals, said intervals comprising equal angular segments between 0° and 360°.

6. The combination as recited in claim 5, wherein multiplex switching means are interposed between said register means and said resolver means, said means being responsive to digital control signals for alternately connecting signals from the correction circuit means and the register means to said resolvers during the proper octant angular interval for driving the resolvers.

7. The combination as recited in claim 6, wherein said multiplex switching means provides signals to transformer means for combining and orienting said signals to provide sine and cosine drive signals to the resolver and wherein the position of the rotor of said resolver is equivalent to the angle $\theta$.

References Cited

UNITED STATES PATENTS

| | | | |
|---|---|---|---|
| 2,729,773 | 1/1956 | Steele | 318—28 |
| 2,803,003 | 8/1957 | Pfeiffer | 318—24 |
| 3,080,555 | 3/1963 | Vadus et al. | 234—150.53 X |
| 3,141,120 | 7/1964 | Johnson et al. | 318—30 |
| 3,158,738 | 11/1964 | Pfeiffer | 235—186 X |
| 3,180,976 | 4/1965 | Robinson | 235—189 |
| 3,286,245 | 11/1966 | Cozart | 318—28 X |

MALCOLM A. MORRISON, Primary Examiner

ROBERT W. WEIG, Assistant Examiner

U.S. Cl. X.R.

235—150.53